(12) United States Patent
Mallat et al.

(10) Patent No.: US 8,792,553 B2
(45) Date of Patent: Jul. 29, 2014

(54) VIDEO ENHANCEMENT USING RECURSIVE BANDLETS

(75) Inventors: Stephane Mallat, Paris (FR); Guoshen Yu, Minneapolis, MN (US)

(73) Assignee: Zoran (France) S.A., Neuilly-sur-Seine (FR)

( * ) Notice: Subject to any disclaimer, the term of this patent is extended or adjusted under 35 U.S.C. 154(b) by 457 days.

(21) Appl. No.: 12/866,279

(22) PCT Filed: Feb. 6, 2008

(86) PCT No.: PCT/IB2008/051770
§ 371 (c)(1),
(2), (4) Date: Aug. 5, 2010

(87) PCT Pub. No.: WO2009/098546
PCT Pub. Date: Aug. 13, 2009

(65) Prior Publication Data
US 2011/0002384 A1    Jan. 6, 2011

(51) Int. Cl.
*H04N 7/12*    (2006.01)
*H04N 5/21*    (2006.01)
(52) U.S. Cl.
CPC ....................................... H04N 5/21 (2013.01)
USPC ......... 375/240.12; 375/240.19; 375/E07.076; 375/E07.243
(58) Field of Classification Search
None
See application file for complete search history.

(56) References Cited

FOREIGN PATENT DOCUMENTS

| EP | 0674434 A | 9/1995 |
|---|---|---|
| EP | 674434 A2 * | 9/1995 |
| WO | 2007059795 A1 | 5/2007 |

OTHER PUBLICATIONS

Zlokolica et al. "Wavelet-domain video denoising based on reliability measures," IEEE Transactions on Circuits and Systems for Video Technology, IEEE USA vol. 16, No. 8, Aug. 2006, ISSN: 1051-8215.*

(Continued)

*Primary Examiner* — Andy Rao
*Assistant Examiner* — Tyler Edwards
(74) *Attorney, Agent, or Firm* — Vorys, Sater, Seymour and Pease LLP; Vincent M DeLuca

(57) ABSTRACT

A wavelet transform is applied to successive images of a video sequence to obtain wavelet coefficients for each image, and directions of regularity are estimated in association with the wavelet coefficients. Recursive weights are also determined to be associated with the wavelet coefficients. An average multiscale bandlet coefficient associated with a wavelet coefficient for a current image is computed from this wavelet coefficient, the recursive weight associated therewith and a corresponding average multiscale bandlet coefficient computed for a previous image and associated with a wavelet coefficient offset according to the direction of regularity associated with the wavelet coefficient. The average multiscale bandlet coefficients can then be processed to produce an enhanced bandlet image to which an inverse wavelet transform is applied. The determination of a recursive weight associated with a wavelet coefficient for the current image comprises checking a condition between this wavelet coefficient and the corresponding average multiscale bandlet coefficient computed for the previous image, and updating a value of the recursive weight depending on the condition.

15 Claims, 3 Drawing Sheets

(56) References Cited

OTHER PUBLICATIONS

Song et al. "Motion-compensated temporal filtering for denoising in video encoder," Electronic Letters, IEE Stevenage, GB, vol. 40, No. 13, Jun. 24, 2004, ISSN: 0013-5194.*

M.J. Shensa, "The Discrete Wavelet Transform: Wedding the a Trous and Mallat Algorithms", IEEE Transactions on Signal Processing, vol. 40, No. 10, pp. 2464-2482, Oct. 1992.

Zlokolica V. et al., "Wavelet-Domain Video Denoising Based on Reliability Measures", IEEE Transactions on Circuits and Systems for Video Technology IEEE USA, vol. 16, No. 8, Aug. 2006, pp. 993-1007.

Song B.C. et al., "Motion-Compensated Temporal Filtering for Denoising in Video Encoder", Electronics Letters, IEE Stevenage, GB, vol. 40, No. 13, Jun. 24, 2004, 2 pages.

Jin F. et al., "Wavelet Video Denoising with Regularized Multi-Resolution Motion Estimation", Eurasip Journal on Applied Signal Processing Hindawi USA, vol. 2006, No. 7, 2006, pp. 1-11.

International Search Report and Written Opinion in corresponding International Application No. PCT/IB2008/051770 dated, Oct. 10, 2008.

* cited by examiner

VIDEO ENHANCEMENT USING RECURSIVE BANDLETS

BACKGROUND OF THE INVENTION

The invention relates to video enhancement technology. Video enhancement is a process that improves the image values of an input digital video by reducing noise such as camera noise, or distortions such as compression artifacts or by increasing the image sharpness.

Conventional video enhancement systems take advantage of the space and time redundancy between pixel values to suppress noise and distortions by means of averaging filters. To take into account movements in videos, motion-compensated filters average pixel values along estimated motion trajectories. To reduce the memory requirements in a video system, recursive filters are often used. However, when the estimated motion vectors are not accurate, time recursive filters produce strong visual artifacts in the processed video.

An efficient adaptive spatial image filtering is implemented by thresholding wavelet coefficients determined from the image. This is equivalent to adaptively averaging image values over neighborhoods of varying sizes, which are adapted to the local image content. In regular regions, the image values are averaged over large domains whereas they are averaged over smaller domains near edges or irregular textures.

To take advantage of the adaptive averaging capabilities of the wavelet transform together with the time redundancy of a video, motion-compensated time recursive filtering has been proposed to reduce the noise in wavelet coefficients. The time averaging is performed over a scale that depends upon the recursive filter parameters. The efficiency of these noise reduction algorithms depends on the ability to automatically and appropriately adjust the recursive filter parameters. Ad-hoc procedures have been developed in "Wavelet video denoising with regularized multiresolution motion estimation", F. Jin, et al., EURASIP Journal on Applied Signal Processing, Volume 2006, pp. 1-11, January 2007, and in "Wavelet-domain Video Denoising Based on Reliability Measures", V. Zlokolica, et al., IEEE Transactions on Circuits and Systems for Video Technology, Vol. 16, No. 8, pp. 993-1007, August 2006. These procedures adjust the recursive parameters based on some measurement of the motion reliability and an estimation of the noise level. The adjustment of the recursive parameters may not provide an automatic multiscale transform in time that relies on a stable signal representation, and thus does not guarantee a robust noise reduction algorithm.

WO 2007/059795 discloses implementing space-time noise reduction algorithms with bandlet transforms constructed with multiscale linear combinations of wavelet coefficients along spatial or temporal geometric flows. Thresholding bandlet coefficients provides a robust procedure to adaptively perform a space-time signal averaging that adjusts the scale in time and in space to the local variations of the signal content. However, for videos, state of the art multiscale bandlet averaging requires storing, reading and writing at least one frame per scale, which is expensive in terms of memory storage and bandwidth.

Some video enhancement systems can sharpen the image by amplifying high frequencies. Non-linear sharpness enhancement methods have been applied to wavelet coefficients by amplifying these coefficients depending on the scale. A wavelet enhancement system can integrate noise reduction and enhancement by setting to zero smaller coefficients and amplifying larger ones. However such enhancement systems do not take advantage of the time regularity of videos. A video bandlet sharpness enhancement procedure can be implemented with the same type of enhancement operators as wavelet enhancement, but applied to bandlet coefficients, thus taking advantage of the time redundancy of videos. Like for noise reduction, state of the art bandlet systems require writing many intermediate frames.

There is a need for a video enhancement system capable of obtaining reliable results for various kinds of video signals, using a fairly stable basis or frame for decomposing the video images. It is also desirable to find an appropriate procedure to adapt multiscale recursive filtering parameters in order to compute multiscale bandlet coefficients that are thresholded or amplified to perform an adaptive enhancement.

SUMMARY OF THE INVENTION

A video enhancement method is proposed, which comprises:
  applying a wavelet transform to successive images of a video sequence to obtain wavelet coefficients for each image;
  estimating directions of regularity associated with wavelet coefficients obtained for a current image of the video sequence;
  determining recursive weights associated with said wavelet coefficients for the current image;
  computing average multiscale bandlet coefficients for the current image, wherein an average multiscale bandlet coefficient associated with a wavelet coefficient for the current image is computed from said wavelet coefficient, the recursive weight associated with said wavelet coefficient and a corresponding average multiscale bandlet coefficient computed for a previous image and associated with a wavelet coefficient offset according to the direction of regularity associated with said wavelet coefficient for the current image;
  processing the average multiscale bandlet coefficients for the current image to produce an enhanced bandlet image; and
  applying an inverse wavelet transform to the enhanced bandlet image.

The determination of a recursive weight associated with a wavelet coefficient for the current image comprises checking a condition between said wavelet coefficient and said corresponding average multiscale bandlet coefficient computed for the previous image, and updating a value of said recursive weight depending on said condition.

This kind of video enhancement system has the advantages of multiscale time-space geometric averaging of bandlet transforms. It decomposes the image in a stable bandlet basis or frame, with the low memory requirements of recursive filtering algorithms.

It may happen that the estimation of regularity directions fails to identify a direction of regularity for a wavelet coefficient. In such a situation, the determination of the recursive weight associated with such a wavelet coefficient for the current image comprises resetting said recursive weight to a value such that the multiscale bandlet coefficients associated with said wavelet coefficient for the current image is taken equal to said wavelet coefficient in the step of computing the average multiscale bandlet coefficients.

In an embodiment, checking the condition in the determination of a recursive weight associated with a wavelet coefficient for the current image comprises evaluating a difference between said wavelet coefficient and the corresponding average multiscale bandlet coefficient computed for the previous image, and comparing the difference to a threshold. If the comparison reveals that the corresponding average multiscale bandlet coefficient computed for the previous image is too different from the wavelet coefficient (above the threshold), the value of the recursive weight will typically be reset so that the multiscale bandlet coefficients associated with the wavelet coefficient for the current image becomes equal to said wavelet coefficient.

A possible expression for the average multiscale bandlet coefficient AI(m, j, k, t) associated with a wavelet coefficient WI(m, j, k, t) for the current image is:

$$AI(m,j,k,t) = \alpha \cdot WI(m,j,k,t) + (1-\alpha) \cdot AI(p,j,k,t-1),$$

where $\alpha = 1/w(m, j, k, t)$ is the inverse of the recursive weight w(m, j, k, t) associated with the wavelet coefficient, m is an index for a position in the image, j and k are scale and orientation indexes of the wavelet transform, t is a time index of the current frame and t−1 is a time index of the previous frame.

A way of updating the value of the recursive weight, when the threshold is not exceeded, is then to increase the recursive weight w(m, j, k, t) by one. This has a number of interesting properties. In particular, it provides orthogonality between first bandlets, linking the images of the video sequence to a difference between each wavelet coefficient obtained from a current image and the corresponding average multiscale bandlet coefficient computed for the previous image, and second bandlets, linking the images of the video sequence to each average multiscale bandlet coefficient associated with a wavelet coefficient for the current image. It also provides orthogonality between the first bandlets, and other bandlets corresponding to the first bandlets in the processing of the previous image.

Another possible way of updating the value of the recursive weight, when the threshold is not exceeded, is to increase the recursive weight w(m, j, k, t) by one as long as the recursive weight remains below a preset maximum value.

Another aspect of the invention relates to a computer program product, comprising instructions to carry out a video enhancement method as outlined above when the program product is run in a computer processing unit. The computer program product can be stored in a non-transitory computer readable medium.

Still another aspect of the invention relates to a video enhancement system comprising: a wavelet transform module for applying a wavelet transform to successive images of a video sequence to obtain wavelet coefficients for each image; an estimating module for estimating directions of regularity associated with wavelet coefficients obtained for a current image of the video sequence; a weight computation module for determining recursive weights associated with said wavelet coefficients for the current image; a recursive bandletization module for computing average multiscale bandlet coefficients for the current image, wherein an average multiscale bandlet coefficient associated with a wavelet coefficient for the current image is computed from said wavelet coefficient, the recursive weight associated with said wavelet coefficient and a corresponding average multiscale bandlet coefficient computed for a previous image and associated with a wavelet coefficient offset according to the direction of regularity associated with said wavelet coefficient for the current image; an enhancement module for processing the average multiscale bandlet coefficients for the current image to produce an enhanced bandlet image; and an inverse wavelet transform module for applying an inverse wavelet transform to the enhanced bandlet image. The weight computation module, for determining of a recursive weight associated with a wavelet coefficient for the current image, is adapted to check a condition between said wavelet coefficient and said corresponding average multiscale bandlet coefficient computed for the previous image, and to update a value of said recursive weight depending on said condition.

BRIEF DESCRIPTION THE DRAWINGS

DESCRIPTION OF PREFERRED EMBODIMENTS

Figure 1:
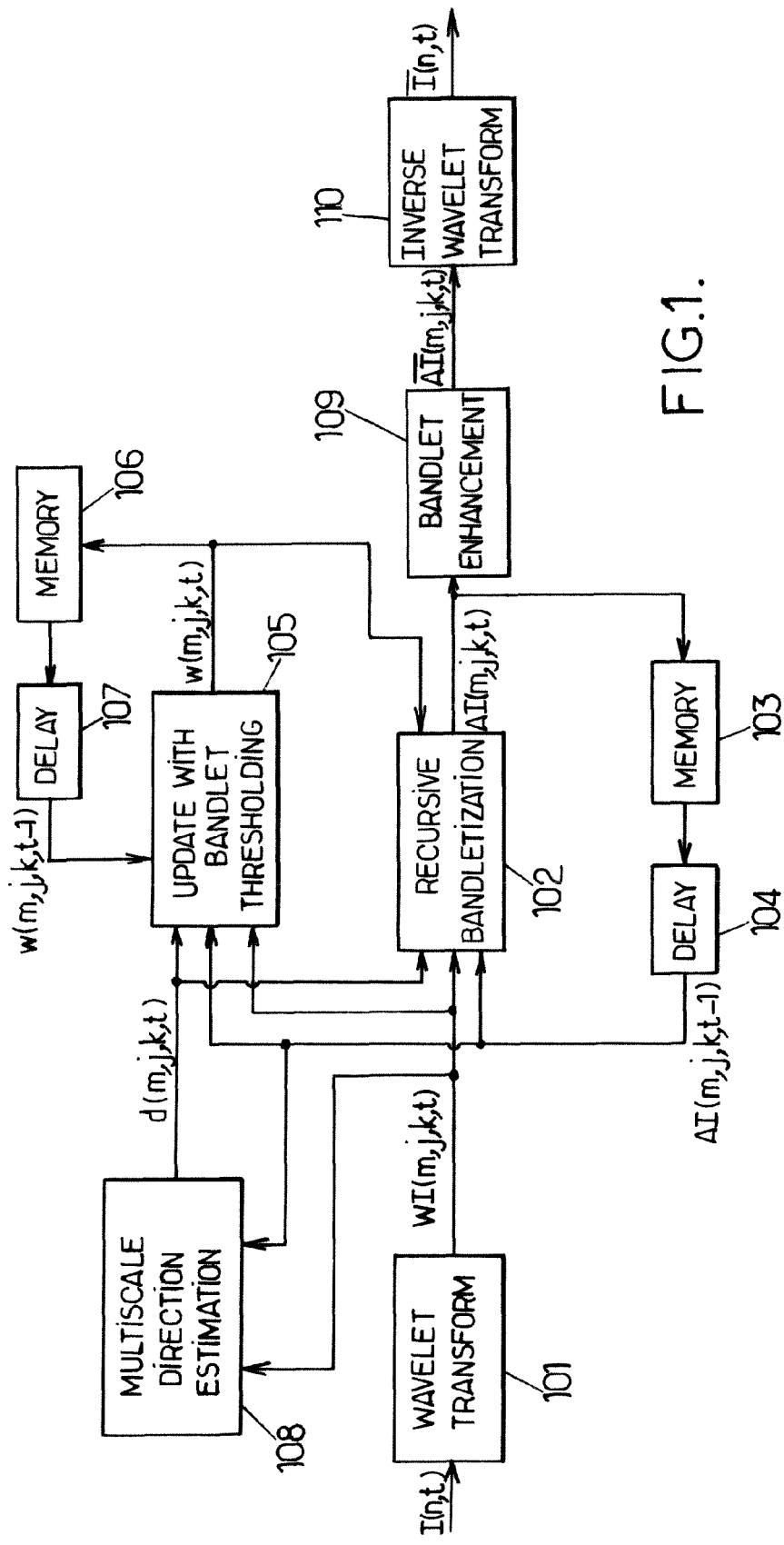
FIGS. 1 and 2 are block diagrams of exemplary video enhancement systems according to the invention.

FIG. 1 shows a system exemplifying the present invention. The input video is composed of images I(n, t) for $n=(n_1, n_2)$ at time t. The image size is $N_1 \times N_2$ with $1 \leq n_1 \leq N_1$ and $1 \leq n_2 \leq N_2$. The wavelet transform module 101 receives the successive input images I(n, t) of the video sequence to be enhanced, and applies a spatial wavelet transform to produce sets of wavelet coefficients forming a wavelet image WI(m, j, k, t) for each time index t, scale index j such that $1 \leq j \leq J$ (the wavelet scale being $2^j$) and orientation index k such that $1 \leq k \leq K$, where $m=(m_1, m_2)$ denotes the spatial position of the wavelet coefficient WI(m, j, k, t) in the image. The wavelet coefficient WI(m, j, k, t) is the spatial inner product of the image I(n, t) with a wavelet $\psi_{j,m}^{k}(n)$:

$$WI(m, j, k, t) = \sum_n I(n, t) \cdot \psi_{j,m}^k(n) \tag{1}$$

The wavelet $\psi_{j,m}^{k}(n)$ has a support that is proportional to the scale $2^j$, and is centered on a point p(m, j, k) that depends upon the spatial index m. The wavelet transform also produces a low frequency image at the largest scale $2^J$, which we choose to index with k=0. It corresponds to the inner product of the image I(n, t) with an averaging filter $\psi_{J,m}^0(n) = \phi_{J,m}(n)$ whose support is proportional to $2^J$.

Any state of the art wavelet transform may be used in module 101. It may be an orthogonal or biorthogonal separable wavelet transform, in which case there are K=3 orientations k=1, 2, 3. For a biorthogonal wavelet transform, the support of $\psi_{j,m}^k(n)$ is typically centered at $p(m, j, k) = (2^j \cdot (m_1 + \frac{1}{2}), 2^j \cdot (m_2 + \frac{1}{2}))$, and for fixed k and j, the wavelet image WI(m, j, k, t) is of size $N_1 \times N_2 \times 2^{-2j}$.

Redundant wavelet transforms, producing wavelet coefficient images of larger sizes with known filter banks, can also be used. If a translation-invariant transform is used (see, e.g., M. J. Shensa "The discrete wavelet transform: wedding the à trous and Mallat algorithms", IEEE Transactions on Signal Processing, vol. 40, no. 10, pp. 2464-2482, October 1992), the wavelet images WI(m, j, k, t) have the same size $N_1 \times N_2$ as the original image and the support of $\psi_{j,m}^k(n)$ is typically centered at p(m, j, k)=m.

The wavelet transform images WI(m, j, k, t) produced by module 101 at time t are fed to a recursive bandletization module 102 which computes average bandlet coefficient images AI(m, j, k, t). The computation is recursive since, for each pair of scale and orientation indexes j, k, the average bandlet coefficient image AI(m, j, k, t) at time t depends on the same image AI(m, j, k, t−1) at time t−1, retrieved from a memory 103 with a delay of one frame (104). The expression of AI(m, j, k, t) can be:

$$AI(m,j,k,t) = \alpha \cdot WI(m,j,k,t) + (1-\alpha) \cdot AI(p,j,k,t-1) \tag{2}$$

where $\alpha=1/w(m, j, k, t)$ is the inverse of a recursive weight $w(m, j, k, t)$ obtained from an updating module 105, and $p=(p_1, p_2)=m-d(m, j, k, t)$ is a pixel position corresponding to position $m=(m_1, m_2)$ offset according to a regularity direction $d(m, j, k, t)$.

The regularity directions $d(m, j, k, t)$ are received from a multiscale direction estimation module 108. For each scale $2^j$, orientation k and position m, if the module 108 estimates that there is no regularity direction, which we represent by the symbol $d(m, j, k, t)$=nil, then the recursive bandletization module 102 resets the average bandlet coefficient $AI(m, j, k, t)=WI(m, j, k, t)$, i.e. $\alpha=w(m, j, k, t)=1$.

Each average bandlet coefficient can be seen as the inner product of the video $I(n, u)$ with a causal space-time bandlet $a_{j,m,t}^k(n,u)$:

$$AI(m, j, k, t) = \langle l(n, u), a_{j,m,t}^k(n, u) \rangle = \sum_{u \leq t} \sum_n l(n, u) \cdot a_{j,m,t}^k(n, u) \quad (3)$$

where $a_{j,m,t}^k(n,u)=0$ for $u>t$, $a_{j,m,t}^k(n,t)=\alpha \cdot \psi_{j,m}^k(n)$ and $a_{j,m,t}^k(n,u)=(1-\alpha) \cdot a_{j,p,t-1}^k(n,u)$ for $u \leq t-1$. An average bandlet is thus a space-time vector that is obtained by averaging spatial wavelets when moving in time along the directions of regularity.

The updating module 105 computes the recursive weights $w(m, j, k, t)$ using a bandlet thresholding procedure. The inputs of module 105 include the current wavelet transform images $WI(m, j, k, t)$ from module 101, the average bandlet coefficients $AI(m, j, k, t-1)$ at time $t-1$ and the regularity directions $d(m, j, k, t)$. If $d(m, j, k, t)$=nil, which means that no regularity direction could be estimated for pixel m, scale $2^j$ and orientation k, then the updating module 105 sets $w(m, j, k, t)=1$. If $d(m, j, k, t) \neq$ nil, the updating module 105 computes a difference bandlet coefficient:

$$DI(m,j,k,t)=WI(m,j,k,t)-AI(p,j,k,t-1), \quad (4)$$

with $p=m-d(m, j, k, t)$. The coefficient $DI(m, j, k, t)$ can thus be seen as the inner product of the input image with a causal difference bandlet $d_{j,m,t}^k(n,u)$:

$$DI(m, j, k, t) = \langle l(n, u), d_{j,m,t}^k(n, u) \rangle = \sum_{u \leq t} \sum_n l(n, u) \cdot d_{j,m,t}^k(n, u) \quad (5)$$

where $d_{j,m,t}^k(n,u)=0$ for $u>t$, $d_{j,m,t}^k(n,t)=\psi_{j,m}^k(n)$ and $d_{j,m,t}^k(n,u)-a_{j,p,t-1}^k(n,u)$ for $u \leq t-1$.

The updating performed by module 105 is also of recursive nature, and it involves a thresholding operation applied to the difference bandlet coefficients $DI(m, j, k, t)$. The module 105 receives the recursive weights $w(m, j, k, t-1)$ at time $t-1$, retrieved from a memory 106 with a delay of one frame (107). It outputs the recursive weights $w(m, j, k, t)$ which are stored in memory 106.

In an embodiment, weights are additively updated with a thresholding rule. For example, if $|DI(m, j, k, t)|>T_{j,k}$, where $T_{j,k}$ is a predefined threshold that may depend on the scale $2^j$ and orientation k, then the module 105 sets $w(m, j, k, t)=1$; otherwise it computes:

$$w(m,j,k,t)=w(m,j,k,t-1)+C[w(m,j,k,t-1)] \quad (6)$$

where $C[x] \geq 0$ is a prescribed positive updating function.

The additivity of the weight guarantees that the averaging time scale is progressively increased with a condition on the amplitude of the difference bandlet coefficient. This yields a multiscale signal representation in time.

In a simple embodiment, we set $C[x]=1$. In this case, the two bandlets $d_{j,m,t}^k(n,u)$ and $a_{j,m,t}^k(n,u)$ are orthogonal, and that $d_{j,m,t}^k(n,u)$ is also orthogonal to the previous bandlet $d_{j,m,t-1}^k(n,u)$. Increasing by 1 the weight $w(m, j, k, t)$ when a difference bandlet coefficient is below a threshold is equivalent to setting to zero orthogonal bandlet coefficients. The recursive time averaging gives the signal reconstruction from these thresholded orthogonal bandlet coefficients. It can also be observed that the time support of both $d_{j,m,t}^k(n,u)$ and $a_{j,m,t}^k(n,u)$ is equal to $w(m, j, k, t)$ which can be interpreted as a scale factor along time.

Alternatively, we can take $C[x]=1$ if $x<w_{max}$ and $C[x]=0$ if $x \geq w_{max}$. This limits the maximum time scale of the bandlets and allows to store the recursive weights $w(m, j, k, t)$ on a number of bits smaller than $\log_2 w_{max}+1$. The parameter $w_{max}$ is set depending on the maximum expected time correlation of the video and/or on the bit allocation to the recursive weights.

The multiscale direction estimation module 108 can operate based on the wavelet coefficients $WI(m, j, k, t)$ from unit 101 and the delayed bandlet coefficients $AI(m, j, k, t-1)$ from memory 103. It estimates directions of regularity for each scale $2^j$ and orientation k. For each position m, the module 108 computes $d(m, j, k, t)$ such that the values of $WI(m', j, k, t)$ for m' in the neighborhood of m are similar to the values of $AI(p', j, k, t-1)$ for p' in the neighborhood of $p=m-d(m, j, k, t)$.

The direction estimation may be regularized to increase its robustness to the signal noise. Any state of the art process may be used to compute the directions $d(m, j, k, t)$.

In an exemplary embodiment, $d(m, j, k, t)$ can be calculated with a conventional block matching procedure. This direction is then selected among a set of candidates $D_j$ which depends on the scale $2^j$. The best match for position m is defined as a point $p=m-d$ with $d \in D_j$ such that the values $WI(m', j, k, t)$ for $m'=m-\tau$, where $\tau$ spans a rectangular block $R_j$, are the most similar (within the meaning of a certain distance function) to the values $AI(p', j, k, t-1)$ for $p'=p-\tau$ where $\tau$ spans $R_j$.

In an exemplary embodiment, the block matching is performed with an $L^1$ distance. For some predefined threshold $T_j^k$, if $$\min_{d \in D_j} \sum_{\tau \in R_j} |WI(m-\tau, j, j, t) - AI(m-d-\tau, k, j, t-1)| > T_j^k,$$

then we set $d(m, j, k, t)$=nil, i.e. there is no direction of sufficient regularity. Otherwise, a best match is obtained with:

$$d(m, j, k, t) = \underset{d \in Dj}{\operatorname{argmin}} \sum_{\tau \in R_j} |WI(m-\tau, k, j, t) - AI(m-d-\tau, k, j, t-1)| \quad (7)$$

and this value of $d(m, j, k, t)$ is output by module 108. Known block matching algorithms can be used to reduce the number of operations required to compute a direction corresponding to a best match.

The average bandlet coefficients $AI(m, k, j, t)$ computed by the recursive bandletization module 102 are supplied to a bandlet enhancement module 109 which enhances these coefficients to output enhanced average bandlet coefficients $\overline{AI}(m,j,k,t)$ using state of the art enhancement operators. The enhancement calculation depends on the particular video enhancement application carried out by the system. Noise reduction, reduction of blocking artifacts produced by compression algorithms, sharpness enhancement and suppression of blur are examples of applications.

In an exemplary embodiment for noise reduction, the bandlet enhancement can be implemented by a thresholding operator that sets to zero or decreases the amplitude of all coefficients below a threshold value that is proportional to the estimated noise standard deviation. In another exemplary embodiment, module 109 performs block thresholding to attenuate the coefficient values depending on the amplitude of the neighboring subband coefficients. In yet another embodiment, to enhance the high frequencies of the signal, the amplitude of certain average bandlet coefficients can be enhanced by a combination of a thresholding operator and of an amplification operator that amplifies coefficients above a threshold.

The enhanced average bandlet coefficients $\overline{AI}(m,j,k,t)$ are supplied to an inverse wavelet transform module 110 which applies the inverse transform corresponding to the wavelet transformed applied by module 101. The enhanced average bandlet coefficients are then considered as wavelet coefficients to which the inverse wavelet transform operator is applied. The inverse wavelet transform module 110 outputs a reconstructed image $\tilde{I}(n,t)$.

Figure 2:
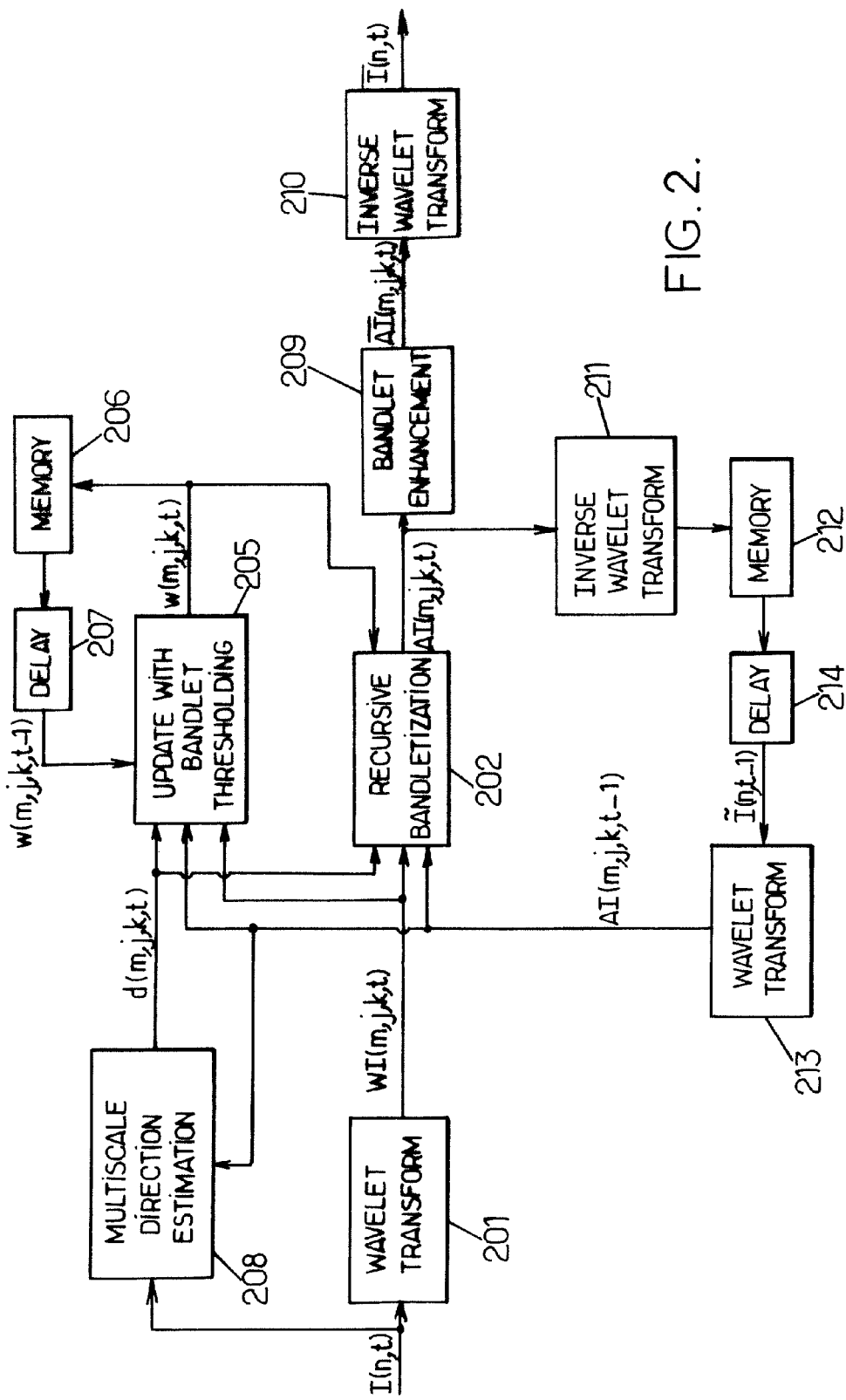

FIG. 2 shows an alternative embodiment of a video enhancement system. In this embodiment, the system does not store average bandlet coefficients but the corresponding images, in order to reduce the required memory space when the wavelet transform is highly redundant.

The processing modules 201, 202, 205, 206, 207, 209 and 210 of FIG. 2 are respectively identical to modules 101, 102, 105, 106, 107, 109 and 110 of FIG. 1. However, the bandlet coefficients AI(m, k, j, t) output by the recursive bandletization module 202 are not stored directly. Instead, an inverse wavelet transform module 211 converts these coefficients AI(m, k, j, t) into a regularized image $\tilde{I}(n,t)$ stored in a memory 212. The average bandlet coefficients AI(m, k, j, t−1) supplied to the recursive bandletization module 202 and to the updating module 205 are computed by a wavelet transform module 213 from the regularized image $\tilde{I}(n,t-1)$ read from the memory 212 with a delay of one frame (214).

In the embodiment of FIG. 2, the direction estimation module 208 operates directly on the input image I(n, t) which it compares to the regularized image $\tilde{I}(n,t-1)$. For each 2D position m, module 208 computes d(m, t) such that the values of I(m', t) for m' in a neighborhood of m are similar to the values of $\tilde{I}(p',t-1)$ for p' in the neighborhood of p=m−d(m, t). From d(m, t), module 208 derives and outputs multiscale directions d(m, j, k, t) computed for each wavelet scale and orientation.

Any state of the art process may be used to compute the directions d(m, t). In an exemplary embodiment, d(m, t) is calculated from the two images I(n, t) and $\tilde{I}(n,t-1)$, with a state of the art block matching procedure. The direction d(m, t) is then selected among a set of candidates D. A block matching procedure isolates a block of signal values at positions m−τ around m, where τ belongs to a typical block R. For example, block matching is performed with an $L^1$ distance. For some predefined threshold T, if $$\min_{d \in D} \sum_{\tau \in R} |I(m - \tau, t) - \tilde{I}(m - d - \tau, t - 1)| > T,$$

then we set d(m, t)=nil. Otherwise, a best match is obtained with:

$$d(m, t) = \underset{d \in D}{\mathrm{argmin}} \sum_{\tau \in R} |I(m - \tau, t) - \tilde{I}(m - d - \tau, t - 1)| \qquad (8)$$

Multiscale directions d(m, j, k, t) are derived from d(m, t) by mapping the directions over original image pixels onto directions over wavelet coefficients. In an exemplary embodiment, the respective integer $p_1$ closest to the center p(m, j, k) of the support of $\psi_{j,m}^k(n)$ is associated with (m, j, k). If p(q, j, k) is the center of the support of $\psi_{j,q}^k(n)$ that is the closest to $p_1-d(p_1, t)$, then we set d(m, j, k, t)=m−q.

Figure 3:
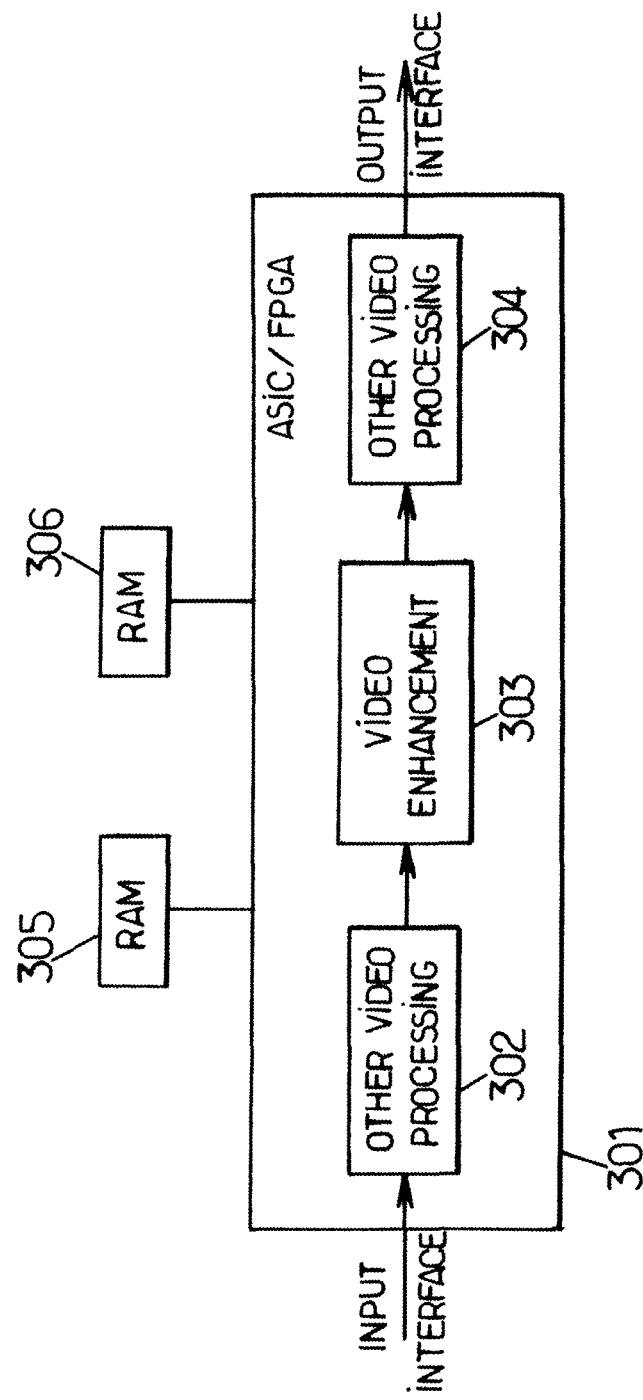
FIG. 3 is a diagram of an electronic chip which may incorporate such a system.

The above-described embodiments of a video enhancement method may be implemented by means of software run by general-purpose microprocessors or digital signal processors, in which case the modules described above with reference to FIGS. 1-2 are understood to be or form part of software modules or routines. The video enhancement system is then a combination of hardware and software. The method may also be implemented in a hardware component as illustrated in FIG. 3, for example in an application-specific integrated circuit (ASIC) or field-programmable gate array (FPGA) which may optionally incorporate additional video processing blocks 302, 304, before and/or after the video enhancement block 303. In an exemplary embodiment, the video processing blocks 302, 303, 304 are implemented in a single chip 301. The chip also has video input and output interfaces, and external RAM (random access memory) devices 305 and 306 as temporary storage required for different video processing steps. Other variants of this embodiment can be equally considered as part of the invention, with more complete video processing chips, or even system-on-chip devices including other functionalities. The hardware device can then be incorporated into various kinds of video apparatus.

The invention claimed is:

1. A video enhancement method comprising:
   applying a wavelet transform to successive images of a video sequence to obtain wavelet coefficients for each image;
   estimating directions of regularity associated with wavelet coefficients obtained for a current image of the video sequence;
   determining recursive weights associated with said wavelet coefficients for the current image;
   computing average multiscale bandlet coefficients for the current image, wherein an average multiscale bandlet coefficient AI(m, j, k, t) associated with a wavelet coefficient WI(m, j, k, t) for the current image is computed as AI(m, j, k, t)=α·WI(m, j, k, t)+(1−α)·AI(p, j, k, t−1), where α=1/w(m, j, k, t) is the inverse of the recursive weight w(m, j, k, t) associated with said wavelet coefficient, m is an index for a position in the image, j and k are scale and orientation indexes of the wavelet transform, t is a time index of the current image and t−1 is a time index of a previous image;
   processing the average multiscale bandlet coefficients for the current image to produce an enhanced bandlet image; and
   applying an inverse wavelet transform to the enhanced bandlet image,
   wherein determining a recursive weight associated with a wavelet coefficient for the current image comprises:
      evaluating a difference between said wavelet coefficient and said corresponding average multiscale bandlet coefficient computed for the previous image; and
      updating a value of said recursive weight, whereby said recursive weight is reset if said difference is above a threshold, and increased as w(m, j, k, t)=w(m, j, k, t−1)+C[w(m, j, k, t−1)] if said difference is below the threshold, where C[·] is a positive updating function.

2. The method as claimed in claim 1, wherein determining a recursive weight associated with a wavelet coefficient for the current image comprises, if no direction of regularity could be estimated for said wavelet coefficient, resetting said recursive weight to a value such that the average multiscale bandlet coefficient associated with said wavelet coefficient for the current image is taken equal to said wavelet coefficient in the step of computing the average multiscale bandlet coefficients.

3. The method as claimed in claim 1, wherein updating the value of the recursive weight comprises, if said difference is above the threshold, resetting said recursive weight to a value such that the average multiscale bandlet coefficient associated with the wavelet coefficient for the current image is taken equal to said wavelet coefficient in the step of computing the average multiscale bandlet coefficients.

4. The method as claimed in claim 1, wherein updating the value of the recursive weight comprises, if said difference is below the threshold, increasing the recursive weight by one.

5. The method as claimed in claim 1, wherein updating the value of the recursive weight comprises, if said difference is below the threshold, increasing the recursive weight by one as long as the recursive weight remains below a preset maximum value.

6. The method as claimed in claim 1, wherein updating the value of the recursive weight is performed so as to provide orthogonality between first bandlets linking the images of the video sequence to a difference between each wavelet coefficient obtained from a current image and the corresponding average multiscale bandlet coefficient computed for the previous image, and second bandlets, linking the images of the video sequence to each average multiscale bandlet coefficient associated with a wavelet coefficient for the current image.

7. The method as claimed in claim 1, wherein updating the value of the recursive weight is performed so as to provide orthogonality between first bandlets, linking the images of the video sequence to a difference between each wavelet coefficient obtained from a current image and the corresponding average multiscale bandlet coefficient computed for the previous image, and other bandlets corresponding to said first bandlets in the processing of the previous image.

8. A video enhancement system comprising:
a wavelet transform module for applying a wavelet transform to successive images of a video sequence to obtain wavelet coefficients for each image;
an estimating module for estimating directions of regularity associated with wavelet coefficients obtained for a current image of the video sequence;
a weight computation module for determining recursive weights associated with said wavelet coefficients for the current image;
a recursive bandletization module for computing average multiscale bandlet coefficients for the current image, wherein an average multiscale bandlet coefficient AI(m, j, k, t) associated with a wavelet coefficient WI(m, j, k, t) for the current image is computed as AI(m, j, k, t)=α·WI(m, j, k, t)+(1−α)·AI(p, j, k, t−1), where α=1/w(m, j, k, t) is the inverse of the recursive weight w(m, j, k, t) associated with said wavelet coefficient, m is an index for a position in the image, j and k are scale and orientation indexes of the wavelet transform, t is a time index of the current image and t−1 is a time index of a previous image;
an enhancement module for processing the average multiscale bandlet coefficients for the current image to produce an enhanced bandlet image; and
an inverse wavelet transform module for applying an inverse wavelet transform to the enhanced bandlet image,
wherein the weight computation module for determining of a recursive weight associated with a wavelet coefficient for the current image is adapted to evaluate a difference between said wavelet coefficient and said corresponding average multiscale bandlet coefficient computed for the previous image, and to update a value of said recursive weight, whereby said recursive weight is reset if said difference is above a threshold, and increased as w(m, j, k, t)=w(m, j, k, t−1)+C[w(m, j, k, t−1)] if said difference is below the threshold, where C[·] is a positive updating function.

9. The system as claimed in claim 8, wherein the weight computation module is arranged to update the value of the recursive weight, if said difference is above the threshold, by resetting the recursive weight to a value such that the average multiscale bandlet coefficient associated with the wavelet coefficient for the current image is taken equal to said wavelet coefficient by the recursive bandletization module.

10. The system as claimed in claim 8, wherein the weight computation module is arranged to update the value of the recursive weight by increasing the recursive weight by one if said difference is below the threshold.

11. The system as claimed in claim 8, wherein the weight computation module is arranged to update the value of the recursive weight by increasing the recursive weight by one if said difference is below the threshold as long as the recursive weight remains below a preset maximum value.

12. A non-transitory computer-readable medium having a program stored therein, wherein the program comprises:
instructions for applying a wavelet transform to successive images of a video sequence to obtain wavelet coefficients for each image;
instructions for estimating directions of regularity associated with wavelet coefficients obtained for a current image of the video sequence;
instructions for determining recursive weights associated with said wavelet coefficients for the current image;
instructions for computing average multiscale bandlet coefficients for the current image, wherein an average multiscale bandlet coefficient AI(m, j, k, t) associated with a wavelet coefficient WI(m, j, k, t) for the current image is computed as
AI(m, j, k, t)=α·WI(m, j, k, t)+(1−α)·AI(p, j, k, t−1), where α=1/w(m, j, k, t) is the inverse of the recursive weight w(m, j, k, t) associated with said wavelet coefficient, m is an index for a position in the image, j and k are scale and orientation indexes of the wavelet transform, t is a time index of the current image and t−1 is a time index of a previous image;
instructions for processing the average multiscale bandlet coefficients for the current image to produce an enhanced bandlet image; and
instructions for applying an inverse wavelet transform to the enhanced bandlet image,
wherein the instructions for determining a recursive weight associated with a wavelet coefficient for the current image comprise instructions for evaluating a difference between said wavelet coefficient and said corresponding average multiscale bandlet coefficient computed for the previous image, and instructions for updating a value of said recursive weight, whereby said recursive weight is reset if said difference is above a threshold, and increased as $w(m, j, k, t) = w(m, j, k, t-1) + C[w(m, j, k, t-1)]$ if said difference is below the threshold, where $C[\cdot]$ is a positive updating function, said instructions being executed when said program is run in a computer processing unit.

13. The non-transitory computer-readable medium as claimed in claim 12, wherein the instructions for updating the value of the recursive weight comprise instructions for resetting said recursive weight if said difference is above the threshold, the recursive weight being reset to a value such that the average multiscale bandlet coefficient associated with the wavelet coefficient for the current image is taken equal to said wavelet coefficient.

14. The non-transitory computer-readable medium as claimed in claim 12, wherein the instructions for updating the recursive weight comprise instructions for increasing the recursive weight by one if said difference is below the threshold.

15. The non-transitory computer-readable medium as claimed in claim 12, wherein the instructions for updating the recursive weight comprise instructions for increasing the recursive weight by one if said difference is below the threshold as long as the recursive weight remains below a preset maximum value.

* * * * *